(12) United States Patent
McMillan

(10) Patent No.: US 10,088,741 B2
(45) Date of Patent: *Oct. 2, 2018

(54) LIGHT ASSEMBLY FOR A PROJECTOR

(71) Applicant: George Erik McMillan, Hickory, NC (US)

(72) Inventor: George Erik McMillan, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/941,583

(22) Filed: Mar. 30, 2018

(65) Prior Publication Data

US 2018/0224733 A1 Aug. 9, 2018

Related U.S. Application Data

(63) Continuation-in-part of application No. 15/467,712, filed on Mar. 23, 2017, now Pat. No. 9,952,490.

(Continued)

(51) Int. Cl.

| *F21S 4/00* | (2016.01) |
| *F21V 21/00* | (2006.01) |
| *G03B 21/20* | (2006.01) |
| *G03B 21/16* | (2006.01) |
| *F21K 9/235* | (2016.01) |
| *F21V 29/67* | (2015.01) |
| *F21V 17/12* | (2006.01) |
| *F21V 17/06* | (2006.01) |
| *F21V 29/71* | (2015.01) |
| *F21V 23/02* | (2006.01) |

(Continued)

(52) U.S. Cl.
CPC .......... *G03B 21/2033* (2013.01); *F21K 9/235* (2016.08); *F21V 17/06* (2013.01); *F21V 17/12* (2013.01); *F21V 23/02* (2013.01); *F21V 23/06* (2013.01); *F21V 29/67* (2015.01); *F21V 29/713* (2015.01); *G03B 21/16* (2013.01); *G03B 21/208* (2013.01); *G03B 21/2013* (2013.01); *F21Y 2105/10* (2016.08); *F21Y 2115/10* (2016.08)

(58) Field of Classification Search
CPC . F21K 9/23; F21K 9/235; F21V 17/04; F21V 17/06; F21V 17/12; F21V 23/02; F21V 23/06; F21V 29/67; F21V 29/70; F21V 29/71; F21V 29/713; G03B 21/16; G03B 21/2013; G03B 21/2033
USPC .................. 362/249.02–249.05, 311.02, 800
See application file for complete search history.

(56) References Cited

U.S. PATENT DOCUMENTS

| 8,029,149 B2 | 10/2011 | Klepp et al. |
| 2007/0030454 A1 | 2/2007 | Richards et al. |

*Primary Examiner* — Jason Moon Han
(74) *Attorney, Agent, or Firm* — Murphy, Bilak & Homiller, PLLC

(57) ABSTRACT

In one aspect, a light assembly is configured to be installed in a movie theater projector and includes an adaptor configured to mechanically couple to a bulb mount of the projector, a primary LED Emitter mounting plate and LEDs attached to the primary LED Emitter mounting plate. The light assembly also includes a heat sink configured to dissipate heat from the primary LED Emitter mounting plate, a cooling fan configured to generate airflow across the heat sink, a lens mounting plate and a lens configured to collimate light emitted from the LEDs, where the lens is disposed over the lens mounting plate. The light assembly also includes an attachment assembly configured to attach the lens mounting plate to the primary LED Emitter mounting plate. The adaptor may be manipulated to adjust a distance between the bulb mount of the movie theater projector and the primary LED Emitter mounting plate.

15 Claims, 9 Drawing Sheets

Related U.S. Application Data

(60) Provisional application No. 62/312,101, filed on Mar. 23, 2016.

(51) Int. Cl.
*F21V 23/06* (2006.01)
*F21Y 115/10* (2016.01)
*F21Y 105/10* (2016.01)

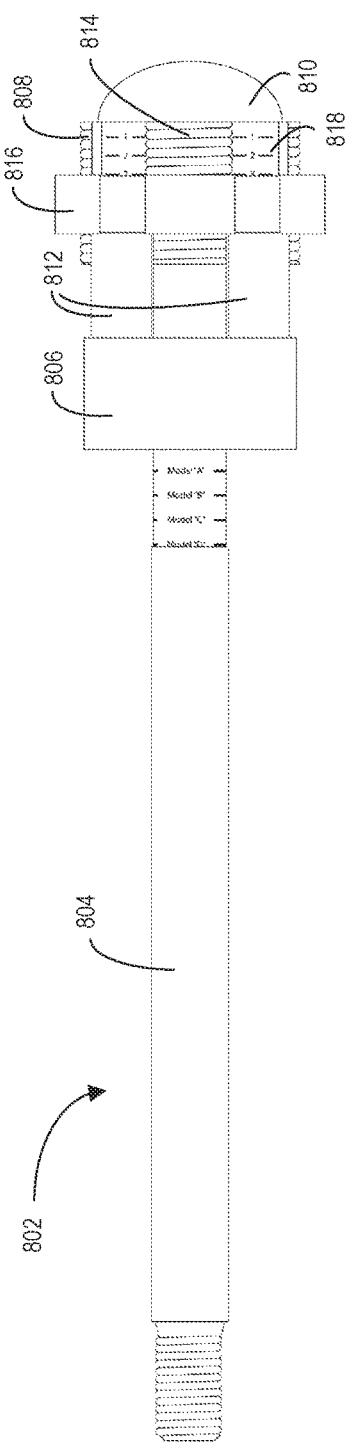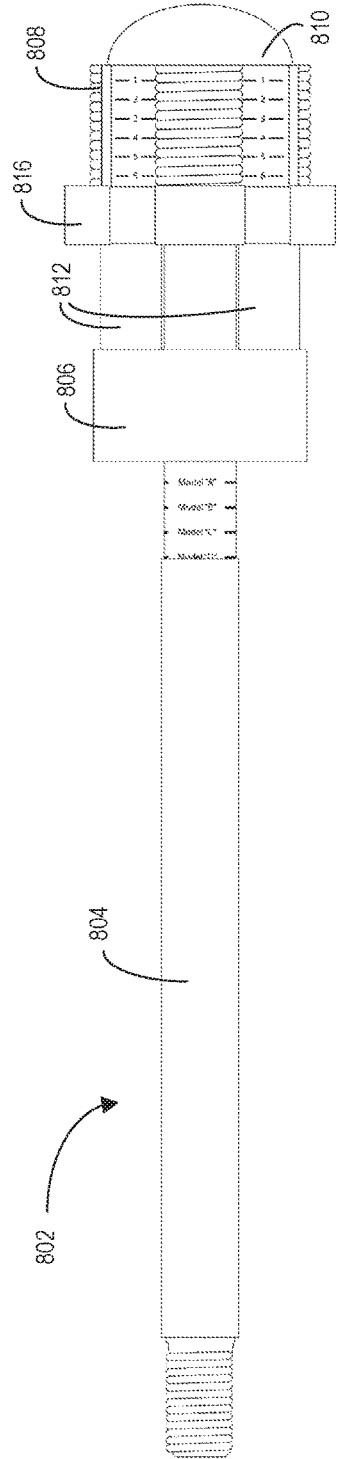
FIG. 8A
FIG. 8B

LIGHT ASSEMBLY FOR A PROJECTOR

RELATED APPLICATIONS

This application is a continuation-in-part of U.S. application Ser. No. 15/467,712, filed Mar. 23, 2017, which claims priority from U.S. Provisional Appl. No. 62/312,101, filed Mar. 23, 2016, the contents of which are incorporated herein in their entireties.

TECHNICAL FIELD

The present disclosure generally relates to lighting fixtures for projectors. More specifically, the present disclosure relates to lighting assemblies incorporating light-emitting diodes (LEDs) configured to retrofit to lighting fixtures previously incorporating incandescent lamps.

BACKGROUND

Theatre, architectural and television projectors project high-intensity beams of light. Currently, two primary types of basic projectors are Analog Film Projectors and Digital Projectors. Both types of projectors utilize very high quality incandescent or High-Intensity Discharge (HID) bulbs to create very intense light to illuminate the film or digital display and focus this display at a distance onto a movie screen.

However, these bulbs are very expensive and have a relatively short lifespan. Currently, many projectors use a Xenon-Plasma HID bulb rated at 3,000-5,000 watts to produce between 20,000 to 34,000 lumens (6-7 LPW). The average lifetime for these types of bulbs is from 6 to 16 weeks. This increases the cost of operation. These types of bulbs also produce an excess amount of heat. Therefore, a high-performance cooling fan and sometimes a secondary roof mounted ventilation fan system is utilized to cool the projector. Further, the projection room requires auxiliary air conditioning to keep temperatures at an acceptable level.

Moreover, plasma HID bulbs contain hazardous material, such as mercury. These bulbs are prone to explode. When they explode, they also damage the projector. In fact, they are so volatile that they are shipped and stored in explosion-proof containment units to prevent bodily harm.

Accordingly, there is a need for an efficient, effective and safe alternative to the bulbs currently used in projectors.

SUMMARY

Embodiments of the present invention provide a light assembly configured to be installed in a high-lumen, high-wattage movie theatre projector.

According to some embodiments, a light assembly configured to be installed in a movie theatre projector includes an adaptor configured to mechanically couple to a bulb mount of the movie theatre projector, a primary LED Emitter mounting plate and at least one LED directly or indirectly attached to the primary LED Emitter mounting plate. The light assembly also includes a heat sink configured to dissipate heat from the primary LED Emitter mounting plate and a cooling fan configured to generate airflow across the heat sink. The light assembly further includes a lens mounting plate and a lens configured to collimate light emitted from the at least one LED, where the lens is disposed over the lens mounting plate. The light assembly includes an attachment assembly configured to attach the lens mounting plate to the primary LED Emitter mounting plate.

The attachment assembly may include a plurality of lens mount standoffs that attach the lens mounting plate to the primary LED Emitter mounting plate so as to maintain a predetermined distance between the at least one LED and the lens. In other embodiments, the attachment assembly may be configured to be manipulated to adjust a distance between the at least one LED and the lens.

According to some embodiments, a light assembly configured to be installed in a movie theatre projector includes an adaptor configured to mechanically couple to a bulb mount of the movie theatre projector at a first end of the adaptor, a primary LED Emitter mounting plate and at least one LED directly or indirectly attached to the primary LED Emitter mounting plate. The light assembly also includes a heat sink configured to dissipate heat from the primary LED Emitter mounting plate and a cooling fan configured to generate airflow past the heat sink. The adaptor includes an elongated portion extending from the first end of the adaptor towards the primary LED Emitter mounting plate, where the adaptor is configured to be manipulated to adjust a length of the elongated portion so as to adjust a location of the primary LED Emitter mounting plate in relation to a projector lens aperture.

According to some embodiments, a light assembly is configured to be installed in a movie theatre projector, the light assembly includes an adaptor configured to mechanically couple to a bulb mount of the movie theatre projector, a primary LED Emitter mounting plate and at least one LED directly or indirectly attached to the primary LED Emitter mounting plate. The light assembly also includes a cooling assembly configured to dissipate heat from the primary LED Emitter mounting plate and a lens configured to collimate light emitted from the at least one LED. The cooling assembly may include a heat sink configured to dissipate heat from the primary LED Emitter mounting plate, a cooling fan configured to generate airflow past the heat sink and/or one or more thermal pads in contact with the primary LED Emitter mounting plate.

According to some embodiments, a light assembly configured to be installed in a movie theatre projector includes an adaptor configured to mechanically couple to a bulb mount of the movie theatre projector, a primary LED Emitter mounting plate and at least one LED directly or indirectly attached to the primary LED Emitter mounting plate. The light assembly also includes a heat sink configured to dissipate heat from the primary LED Emitter mounting plate, a cooling fan configured to generate airflow across the heat sink, a lens mounting plate and a lens configured to collimate light emitted from the at least one LED, where the lens is disposed over the lens mounting plate. The light assembly further includes an attachment assembly configured to attach the lens mounting plate to the primary LED Emitter mounting plate.

The attachment assembly may include a plurality of lens mount standoffs that attach the lens mounting plate to the primary LED Emitter mounting plate so as to maintain a predetermined distance between the at least one LED and the lens. The attachment assembly may be configured to be manipulated to adjust a distance between the at least one LED and the lens. For example, the attachment assembly may be configured to adjust the distance between the at least one LED and the lens in response to a rotation of the attachment assembly or a portion of the attachment assembly.

According to some embodiments, a light assembly configured to be installed in a movie theatre projector includes an adaptor configured to mechanically couple to a bulb mount of the movie theatre projector at a first end of the adaptor, a primary LED Emitter mounting plate and at least one LED directly or indirectly attached to the primary LED Emitter mounting plate. The light assembly also includes a heat sink configured to dissipate heat from the primary LED Emitter mounting plate and a cooling fan configured to generate airflow past the heat sink. The adaptor includes an elongated portion extending from the first end of the adaptor towards the primary LED Emitter mounting plate, where the adaptor is configured to be manipulated to adjust a length of the elongated portion so as to adjust a location of the primary LED Emitter mounting plate in relation to a projector lens aperture. The adaptor may be configured to adjust the length of the elongated portion in response to a rotation of the adaptor or the elongated portion.

According to some embodiments, a light assembly configured to be installed in a movie theatre projector includes an adaptor configured to mechanically couple to a bulb mount of the movie theatre projector, a primary LED Emitter mounting plate and at least one LED directly or indirectly attached to the primary LED Emitter mounting plate. The light assembly may include a cooling assembly configured to dissipate heat from the primary LED Emitter mounting plate and a lens configured to collimate light emitted from the at least one LED. The cooling assembly may include a heat sink configured to dissipate heat from the primary LED Emitter mounting plate, a cooling fan configured to generate airflow past the heat sink and/or one or more thermal pads in contact with the primary LED Emitter mounting plate.

In one embodiment, the light assembly includes an adaptor configured to mechanically couple with a bulb mount of the movie theatre projector. The light assembly further includes a female socket rigidly connected to the adaptor and a male socket configured to mate with the female socket. Moreover, the light assembly includes one more cooling fans configured to generate airflow, where the one more cooling fans are attachable to the male socket using a first attaching means. Yet further, the light assembly includes a heat sink configured to dissipate heat, where the heat sink is attachable to the one more cooling fans using the first attaching means; a first thermal transfer pad configured to conduct heat, where the first thermal transfer pad is attachable to the heat sink using a second attaching means; a primary mounting plate configured to be attached to the first thermal transfer pad using the second attaching means; and a second thermal transfer pad configured to conduct heat, where the second thermal transfer pad is attachable to the primary mounting plate using the second attaching means. Moreover, the light assembly includes a board configured to be attached to the second thermal transfer pad using the second attaching means, where an LED Array is configured to generate light, where the LED Array is mounted on the board. Technologies such as Surface-Mounted Device (SMD) and Chip on Board (COB) may be used for the LED Array. Further, the light assembly includes a lens mounting plate configured to be attached to the primary mounting plate using a third attaching means, where the lens mounting plate is transparent to the light emitted by the LED Array; multiple lens mount standoffs configured to maintain a predetermined distance between the lens mounting plate and the primary mounting plate when the lens mounting plate is attached to the primary mounting plate; a lens configured to collimate light emitted from the LED Array, where the lens is disposed over the lens mounting plate; and a lens retainer configured to be attached to the lens mounting plate using a fourth attaching means, where attaching the lens retainer to the lens mounting plate secures a placement of the lens on the lens mounting plate.

In another embodiment of a light assembly configured to be installed in a movie theatre projector, the light assembly includes an adaptor configured to mechanically couple with a bulb mount of the movie theatre projector. The light assembly further includes one or more cooling fans configured to generate airflow, where the one or more cooling fans are attachable to the adaptor using a first attaching means. Further, the light assembly includes a heat sink configured to dissipate heat, where the heat sink is attachable to the one more cooling fans using the first attaching means. The light assembly also includes a first thermal transfer pad configured to conduct heat, where the first thermal transfer pad is attachable to the heat sink using a second attaching means. The light assembly further includes a primary mounting plate configured to be attached to the first thermal transfer pad using the second attaching means. Further, a second thermal transfer pad configured to conduct heat, where the second thermal transfer pad is attachable to the primary mounting plate using the second attaching means. Yet further, a board is configured to be attached to the second thermal transfer pad using the second attaching means. Multiple LEDs are configured to generate light, where the LED Array is mounted on the board. Moreover, a lens mounting plate is configured to be attached to the primary mounting plate using a third attaching means, where the lens mounting plate is transparent to the light emitted by the LED Array. The light assembly further includes multiple lens mount standoffs configured to maintain a predetermined distance between the lens mounting plate and the primary mounting plate when the lens mounting plate is attached to the primary mounting plate. Moreover, a lens is configured to collimate light emitted from the LED Array, where the lens is disposed over the lens mounting plate. Yet further, a lens retainer is configured to be attached to the lens mounting plate using a fourth attaching means, wherein attaching the lens retainer to the lens mounting plate secures a placement of the lens on the lens mounting plate.

In another embodiment of a light assembly configured to be installed in a movie theatre projector, the light assembly includes an adaptor configured to mechanically couple with a bulb mount of the movie theatre projector. Further, the light assembly includes one or more cooling fans configured to generate airflow, where the one or more cooling fans are attachable to the adaptor using a first attaching means. Moreover, the light assembly includes a heat sink configured to dissipate heat, where the heat sink is attachable to the one or more cooling fans using the first attaching means. Further, the light assembly includes a first thermal transfer pad configured to conduct heat, where the first thermal transfer pad is attachable to the heat sink using a second attaching means. Yet further, the light assembly includes a primary mounting plate configured to be attached to the first thermal transfer pad using the second attaching means. Moreover, the light assembly includes a second thermal transfer pad configured to conduct heat, where the second thermal transfer pad is attachable to the primary mounting plate using the second attaching means. Further, the light assembly includes a board configured to be attached to the second thermal transfer pad using the second attaching means. Yet further, the light assembly includes multiple LEDs configured to generate light, where the LED Array is mounted on the board. Moreover, the light assembly includes a shroud configured to collimate light generated by the multiple LEDs onto a projector lens comprised in the movie theatre projector, where the shroud is configured to be attached to the board.

Embodiments of the light assembly have a longer lifespan, which reduces the cost of operation and makes the operation safer. Further, the LEDs contain no harmful materials and they pose no explosion hazard. Moreover, with the introduction of LED industrial lighting, there is an opportunity to utilize this ever-progressing technology for more and more lighting opportunities. Until recently, an endeavor such as this was not possible due to the intense amount of illumination required to "throw" the images of a theater projector for such a long distance. With the advent of new Chips on Board (COB) array emitters and Surface Mount Device (SMD) arrays with unprecedented efficiencies, it is now possible to create and maintain these high light outputs necessary for such utilization.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations, and improvements herein shown and described in various exemplary embodiments.

BRIEF DESCRIPTION OF THE DRAWINGS

FIGS. 8A-8B show perspective views of a light assembly retrofitted in a movie theatre projector and including an attachment assembly, in accordance with some embodiments.

DETAILED DESCRIPTION

Figure 1:
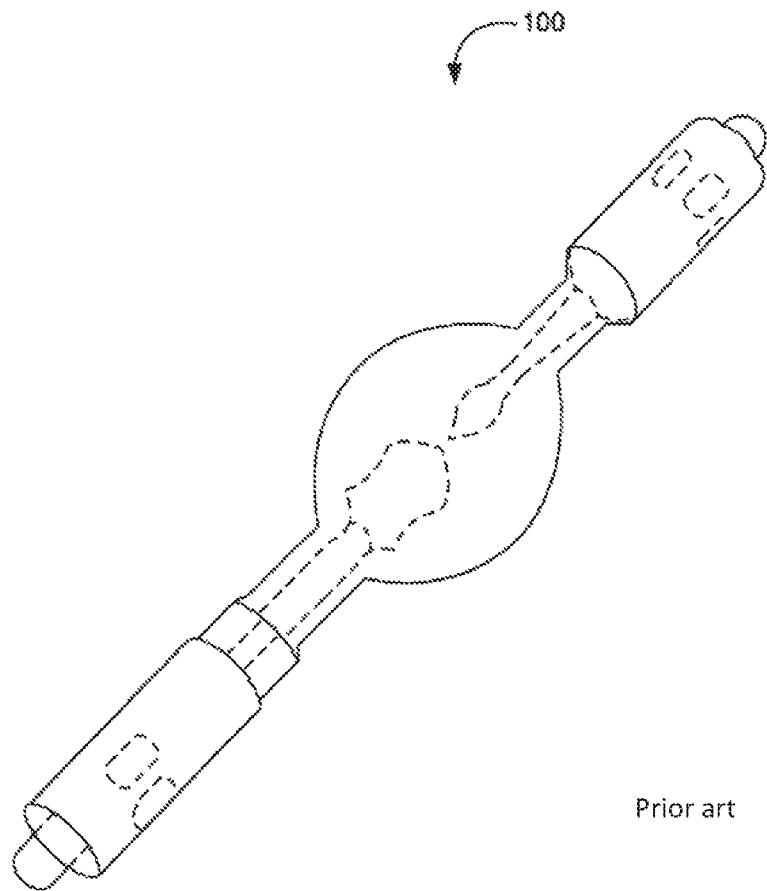
FIG. 1 shows a perspective view of a projector bulb in a light assembly used in theatres, according to prior art.

All descriptions are for the purpose of showing selected versions of the present invention and are not intended to limit the scope of the present invention. Non-limiting and non-exhaustive embodiments of the present invention are described with reference to the preceding figures, wherein like reference numerals refer to like parts throughout the various views unless otherwise precisely specified.

The present disclosure relates to a light assembly configured to be installed in a movie theatre projector. The light assembly is configured to replace one or both of an arc discharge lamp and an incandescent lamp. The light assembly includes an adaptor configured to mechanically couple with a bulb mount of the movie theatre projector. The adaptor may include a cylindrical extension, where an external surface of the cylindrical extension includes screw threading configured to mate with a complimentary screw threading comprised in an internal surface of the bulb mount. Further, the adaptor may be configured to receive electrical power from the bulb mount when the adaptor is mechanically coupled to the bulb mount. The bulb mount may correspond to one of an anode and a cathode.

The light assembly further includes a female socket rigidly connected to the adaptor and a male socket configured to mate with the female socket. Moreover, the light assembly includes one more cooling fans configured to generate airflow, where the one more cooling fans are attachable to the male socket using a first attaching means. The one more cooling fans may include multiple cooling fans configured to be attached to each other or on other areas of the light assembly heat sink using the first attaching means.

Each of the multiple cooling fans may be configured to be simultaneously operational. Further, one or more of the multiple cooling fans may be configured to be activated based on failure of one or more other cooling fan of the multiple cooling fans. Accordingly, the light assembly may include a failure indicator device configured to indicate failure of a cooling fan. Yet further, the light assembly includes a heat sink configured to dissipate heat, where the heat sink is attachable to the one or more cooling fans using the first attaching means; a first thermal transfer pad configured to conduct heat, where the first thermal transfer pad is attachable to the heat sink using a second attaching means; a primary mounting plate configured to be attached to the first thermal transfer pad using the second attaching means; and a second thermal transfer pad configured to conduct heat, where the second thermal transfer pad is attachable to the primary mounting plate using the second attaching means. The light assembly may also include a socket adaptor plate disposed between the male socket and the heat sink, where the socket adaptor plate may be configured to be attached to each of the male socket and the heat sink using the first attaching means. Further, the light assembly may include multiple spacers disposed between the socket adaptor plate and the heat sink, where the multiple spacers may be configured to maintain a predetermined distance between the socket adaptor plate and the heat sink when the socket adaptor plate is attached to the heat sink using the first attaching means.

Moreover, the light assembly includes a board configured to be attached to the second thermal transfer pad using the second attaching means, where an LED Array is configured to generate light, where the LED Array is mounted on the board. The LED array comprises a plurality of LEDs. Technologies such as Surface-Mounted Device (SMD) and Chip on Board (COB) may be used for the LED Array and the board. The primary mounting plate with the LEDs may be considered to be a primary LED Emitter mounting plate.

Further, the light assembly includes a lens mounting plate configured to be attached to the primary mounting plate using a third attaching means, where the lens mounting plate is transparent to the light emitted by the LED Array. The light assembly may include multiple lens mount standoffs configured to maintain a predetermined distance between the lens mounting plate and the primary mounting plate when the lens mounting plate is attached to the primary mounting plate. These lens mount standoffs may be considered to be part of an attachment assembly. The light assembly may also include a lens configured to collimate light emitted from the LED Array, where the lens is disposed over the lens mounting plate, and a lens retainer configured to be attached to the lens mounting plate using a fourth attaching means, where attaching the lens retainer to the lens mounting plate secures a placement of the lens on the lens mounting plate.

According to further aspects, the light assembly may include an AC-DC converter configured to convert alternating current to direct current, where the AC-DC converter may be configured to provide power to the LED Array. Further, the AC-DC converter may include a power adjuster configured to adjust a power level supplied to the LED Array. Also, the AC-DC converter may be electrically connected to the adaptor, where the adaptor is configured to receive electrical power from the bulb mount. Moreover, the AC-DC converter is configured to be attached to the light assembly by using a fifth attaching means.

According to further aspects, the light assembly may include a shroud configured to collimate light generated by the LED Array onto a projector lens comprised in the movie theatre projector. Further, the light assembly may include an adjustment rod configured to adjust an alignment of the light assembly in relation to the projector lens, where a foot portion of the adjustment rod may be configured to be immovably mounted on a base of the movie theatre projector, wherein a head portion of the adjustment rod may be movably attachable to the shroud.

According to further aspects, the adaptor may be further configured to form a tight contact with an interior surface of a projector shroud comprised in the movie projector, where the tight contact directs air flow for cooling, where the light assembly may be configured to be disposed within an interior volume of the projector shroud.

According to some aspects, a light assembly configured to be installed in a movie projector is disclosed. The light assembly includes an adaptor configured to mechanically couple with a bulb mount of the movie theatre projector. The light assembly further includes one or more cooling fans configured to generate airflow, where the one or more cooling fans are attachable to the adaptor using a first attaching means. Further, the light assembly includes a heat sink configured to dissipate heat, where the heat sink is attachable to the one or more cooling fans using the first attaching means. The light assembly also includes a first thermal transfer pad configured to conduct heat, where the first thermal transfer pad is attachable to the heat sink using a second attaching means. The light assembly further includes a primary mounting plate configured to be attached to the first thermal transfer pad using the second attaching means. Further, a second thermal transfer pad is configured to conduct heat, where the second thermal transfer pad is attachable to the primary mounting plate using the second attaching means. Yet further, a board is configured to be attached to the second thermal transfer pad using the second attaching means. Multiple LEDs are configured to generate light, where the LED Array is mounted on the board. Moreover, a lens mounting plate is configured to be attached to the primary mounting plate using a third attaching means, where the lens mounting plate is transparent to the light emitted by the LED Array. The light assembly further includes multiple lens mount standoffs configured to maintain a predetermined distance between the lens mounting plate and the primary mounting plate when the lens mounting plate is attached to the primary mounting plate. Moreover, a lens is configured to collimate light emitted from the LED Array, where the lens is disposed over the lens mounting plate. Yet further, a lens retainer is configured to be attached to the lens mounting plate using a fourth attaching means, where attaching the lens retainer to the lens mounting plate secures a placement of the lens on the lens mounting plate.

According to some aspects, a light assembly configured to be installed in a movie theatre projector includes an adaptor configured to mechanically couple with a bulb mount of the movie projector. Further, the light assembly includes one or more cooling fans configured to generate airflow, where the one or more cooling fans are attachable to the adaptor using a first attaching means. Moreover, the light assembly includes a heat sink configured to dissipate heat, where the heat sink is attachable to the one or more cooling fans using the first attaching means. Further, the light assembly includes a first thermal transfer pad configured to conduct heat, where the first thermal transfer pad is attachable to the heat sink using a second attaching means. Yet further, the light assembly includes a primary mounting plate configured to be attached to the first thermal transfer pad using the second attaching means. Moreover, the light assembly includes a second thermal transfer pad configured to conduct heat, where the second thermal transfer pad is attachable to the primary mounting plate using the second attaching means. Further, the light assembly includes a board configured to be attached to the second thermal transfer pad using the second attaching means. Yet further, the light assembly includes an LED Array configured to generate light, where the LED Array is mounted on the board. Moreover, the light assembly includes a shroud configured to collimate light generated by the LED Array onto a projector lens comprised in the movie theatre projector, where the shroud is configured to be attached to the board.

Referring now to the figures, FIG. 1 shows a projector bulb 100 in a projector used in theatres, according to prior art. The projector bulb 100 may include, but is not limited to, High Intensity Discharge (HID) lamp, Xenon lamp, halogen lamp, mercury short-arc lamp, and metal halide lamp.

Figure 2:
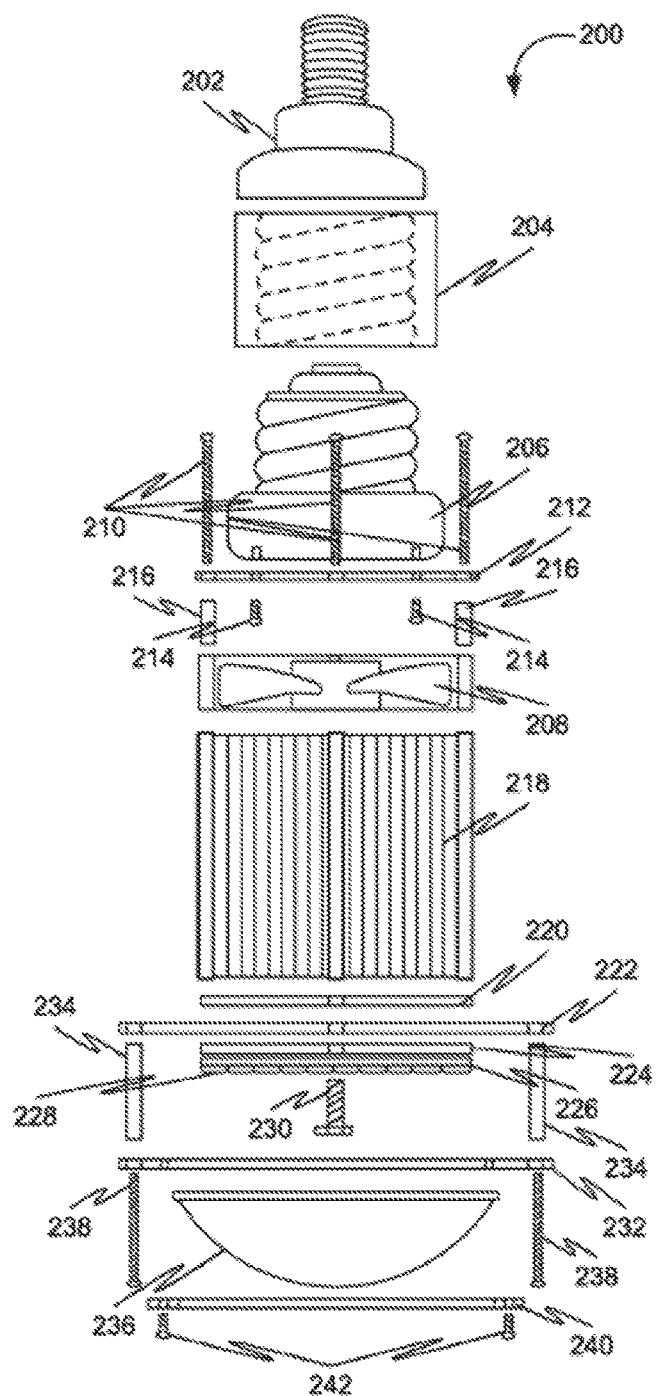
FIG. 2 shows an exploded view of a light assembly configured to be installed in a movie theatre projector, in accordance with various embodiments disclosed herein.
Figure 3:
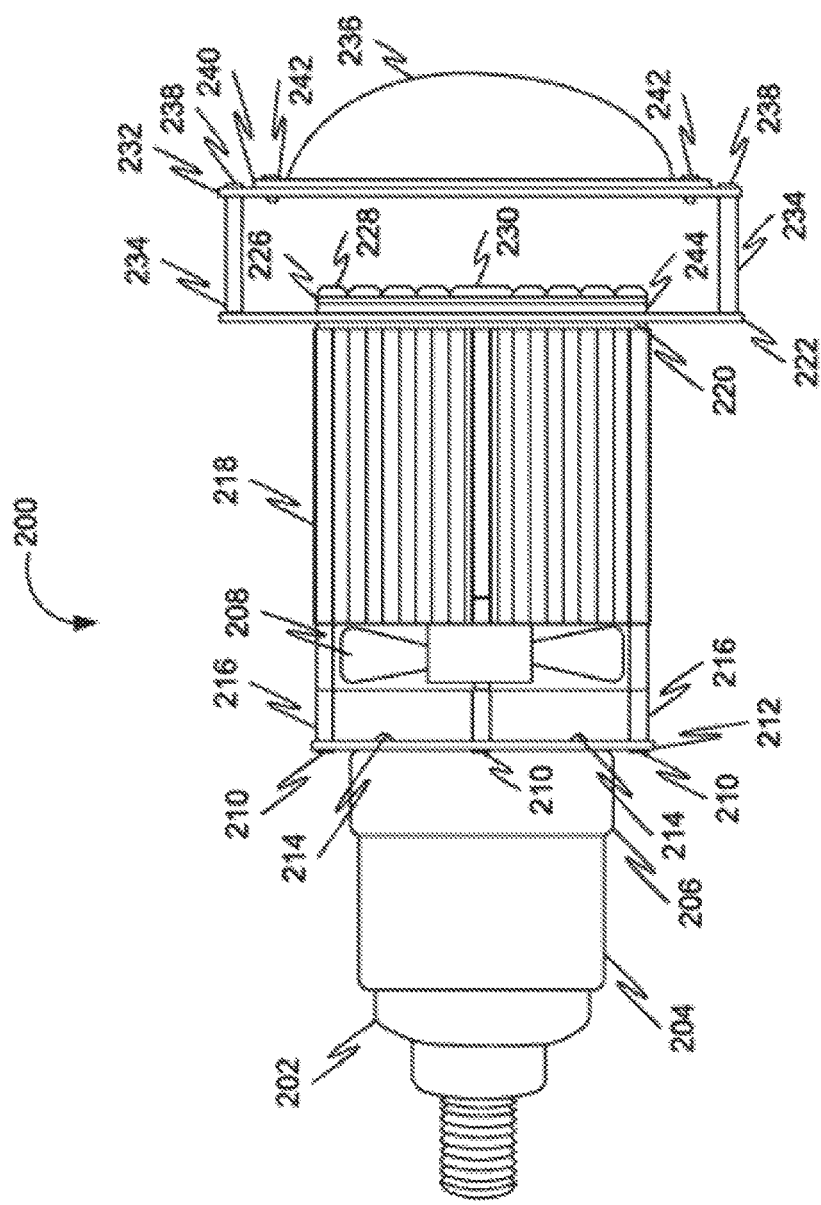
FIG. 3 shows a cross-section view of the light assembly of FIG. 2 after assembly.
Figure 4:
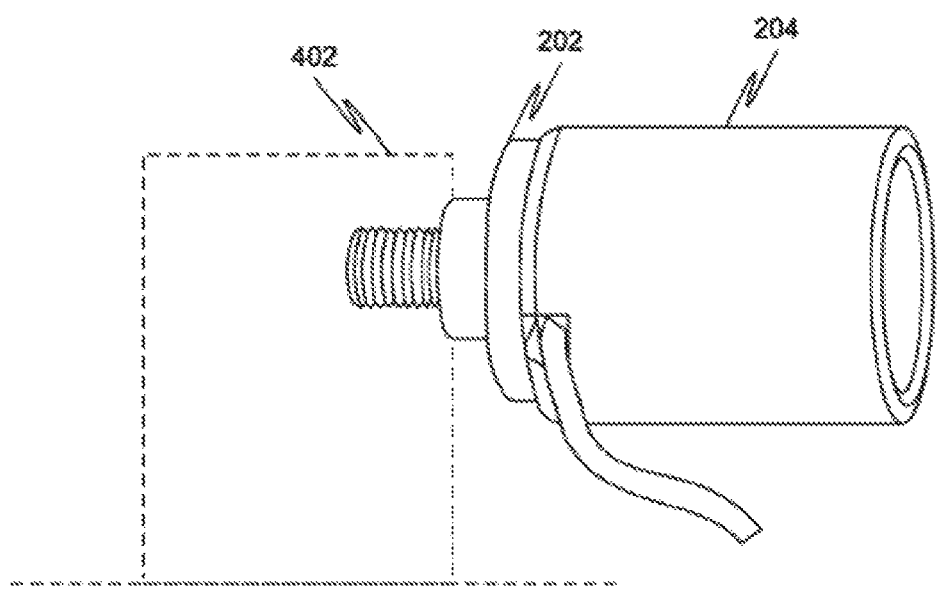
FIG. 4 shows a perspective view of one end of the light assembly of FIG. 2 installed in a movie theatre projector.

FIG. 2 shows an exploded view of a light assembly 200 configured to be installed in a movie theatre projector, in accordance with various embodiments disclosed herein. FIG. 3 shows a cross-section view of the light assembly 200 of FIG. 2, after assembly. FIG. 4 shows a perspective view of one end of the light assembly 200 of FIG. 2 installed in a movie theatre projector. The light assembly 200 may be configured to replace the projector bulb 100, which may an arc discharge lamp and/or an incandescent lamp. The light assembly 200 may include an adaptor 202 configured to mechanically couple with a bulb mount 402 of the movie theatre projector. The adaptor 202 may include a cylindrical extension, where an external surface of the cylindrical extension may include screw threading configured to mate with a complimentary screw threading comprised in an internal surface of the bulb mount 402. Further, the light assembly 200 may include a female socket 204 rigidly connected to the adaptor 202. The light assembly 200 may also include a male socket 206 configured to mate with the female socket 204. Yet further, the light assembly 200 may include one or more cooling fans 208 configured to generate airflow. The one or more cooling fans 208 may be attachable to the male socket 206 using a first attaching means. For example, the first attaching means may include multiple fan mounting screws 210, a socket adaptor plate 212, socket mounting screws 214 and multiple spacers 216.

Moreover, the light assembly 200 may include a heat sink 218 configured to dissipate heat. The socket adaptor plate 212 may be disposed between the male socket 206 and the heat sink 218, where the socket adaptor plate 212 may be configured to be attached to each of the male socket 206 and the heat sink 218 using the first attaching means. The multiple spacers 216 may be disposed between the socket adaptor plate 212 and the heat sink 218, where the multiple spacers 216 may be configured to maintain a predetermined distance between the socket adaptor plate 212 and the heat sink 218 when the socket adaptor plate 212 may be attached to the heat sink 218 using the first attaching means.

Further, the heat sink 218 may be attachable to the one or more cooling fans 208 using the first attaching means. Further, the one or more cooling fans 208 may include multiple cooling fans configured to be attached to each other using the first attaching means. Each of the one or more cooling fans 208 may be configured to be simultaneously operational. Further, one or more cooling fans in the one or more cooling fans 208 may be configured to be activated based on failure of one or more other cooling fans in the one or more cooling fans 208. Accordingly, the light assembly 200 may also include a failure indicator device configured to indicate failure of a cooling fan in the one or more cooling fans 208.

Further, the light assembly 200 may include a first thermal transfer pad 220 configured to conduct heat. The first thermal transfer pad 220 may be attachable to the heat sink 218 using a second attaching means. Yet further, the light assembly 200 may include a primary mounting plate 222 configured to be attached to the first thermal transfer pad 220 using the second attaching means. The light assembly 200 may include a second thermal transfer pad 224 configured to conduct heat. The second thermal transfer pad 224 may be attachable to the primary mounting plate 222 using the second attaching means.

Further, the light assembly 200 may include a board 226 configured to be attached to the second thermal transfer pad 224 using the second attaching means. A Light Emitting Diode (LED) Array 228 may be mounted on the board 226. The LED Array 228 may be configured to generate light and is composed of a multitude of individual LEDs. For example, the second attaching means may include a threaded lamp secure screw 230. Any combination of the heat sink, cooling fan(s), thermal transfer pads, and the first and second attaching means may be considered to be part of a cooling assembly.

In addition, the light assembly 200 may include a lens mounting plate 232 configured to be attached to the primary mounting plate 222 using a third attaching means. The lens mounting plate 232 may be transparent to the light emitted by the LED Array 228. Multiple lens mount standoffs 234 may be configured to maintain a predetermined distance between the lens mounting plate 232 and the primary mounting plate 222 when the lens mounting plate 232 is attached to the primary mounting plate 222. Further, a lens 236 may be disposed over the lens mounting plate 232. The lens 236 may be configured to collimate light emitted from the LED Array 228. For example, the third attaching means may include one or more of the multiple lens mount standoffs 234 and multiple lens mounting screws 238. The third attaching means may be considered to be or considered to be part of an attachment assembly.

Further, a lens retainer 240 may be attached to the lens mounting plate 232. The lens retainer 240 may secure a placement of the lens 236 on the lens mounting plate 232. The lens retainer 240 may be configured to be attached to the lens mounting plate 232 using a fourth attaching means. For example, the fourth attaching means may include lens retaining screws 242.

In some embodiments, the adaptor 202 may be configured to receive electrical power from the bulb mount 402 when the adaptor is mechanically coupled to the bulb mount 402. Accordingly, in an embodiment, the power available at the bulb mount 402 may be used to power the LED Array 228. Therefore, the light assembly 200 may include additional electrical circuitry, such as but not limited to, AC to DC converter connected to the bulb mount and the LED Array 228. In an alternative embodiment, the bulb mount 402 may function as a support for mounting the light assembly 200 while LED Array 228 may be powered either from a DC power source or the AC power source of the movie theatre projector tapped from another point. In other words, in an embodiment, the adaptor 202 may not be configured to establish an electrical connection with the bulb mount 402.

In some embodiments, the bulb mount 402 corresponds to an anode or a cathode. The conventional bulb (such as, the projector bulb 100 used in the movie theatre projector, such as an arc discharge lamp or an incandescent lamp includes two terminals that are configured to electrically connect with an anode terminal and a cathode terminal provided in the movie theatre projector. Further, the conventional projector bulb 100 is configured to be mechanically coupled to each of the anode terminal and the cathode terminal. However, the mechanism of mechanical coupling may differ between the anode terminal and the cathode terminal. In particular, the cathode terminal is configured to be coupled by a screw-based coupling mechanism while the anode terminal is configured to be coupled by a clip-based coupling mechanism. Accordingly, the light assembly 200 may be provided with the adaptor 202 configured to be mechanically coupled with either the anode terminal or the cathode terminal. Further, in some embodiments, the adaptor 202 may be configured to couple with both the anode terminal and the cathode terminal by means of a hybrid coupling mechanism comprised in the adaptor 202 that is configured to mechanically couple with both the anode terminal and the cathode terminal. However, in the case where the adaptor 202 is configured to be mechanically coupled with the anode, a spatial arrangement of the components of the light assembly 200 may be such that the adaptor 202 does not fall in the path of light exiting the lens 236.

In further embodiments, the light assembly 200 may include an AC-DC converter configured to convert alternating current to direct current, wherein the AC-DC converter is configured to provide power to the LED Array 228. According to currently available LED technology, it is preferable to provide only DC to power the LED Array 228. However, in an embodiment, the LED Array 228 may be such that they may safely operate through their life span on AC as well. Accordingly, in an embodiment, the light assembly 200 may not include the AC-DC converter. Further, the LED Array 228 may further be configured to operate directly at the voltage levels generally provided at the bulb mount 402 of the movie projector, such as but not limited to, above 1 kV. Yet further, the AC-DC converter may include a power adjuster configured to adjust a power level supplied to the LED Array 228.

Moreover, the AC-DC converter may be electrically connected to the adaptor 202, where the adaptor 202 is configured to receive electrical power from the bulb mount 402. Accordingly, in an embodiment, although the adaptor 202 may receive electrical power from the bulb mount 402, the AC-DC converter may be situated external to the light assembly 200. Accordingly, the AC-DC converter may not be mechanically attached to the light assembly 200. Further, the AC-DC converter may be configured to be attached to the light assembly 200 by using a fifth attaching means. Accordingly, in an embodiment, the AC-DC converter may be disposed anywhere in the light assembly 200 and attached using one or more of the first attaching means, second attaching means, third attaching means, fourth attaching means and a fifth attaching means. For example, in an embodiment, the AC-DC converter may be disposed on the board 226 comprising the LED Array 228. Accordingly, the light assembly 200 may comprise an electrical path leading from the bulb mount 402 (i.e., one or more of the cathode terminal and the anode terminal of the movie theatre projector) to the AC-DC converter. In another example, the AC-DC converter may be mounted on a separate PCB board configured to be attached to any of the modular components of the light assembly 200. Accordingly, the light assembly 200 may further include electrical paths leading from the bulb mount 402 (i.e., one or more of the anode terminal and the cathode terminal) and to the LED Array 228.

In some embodiments, not all of the components shown in FIGS. 2 and 3 are used to form the light assembly. For example, a light assembly may include the adaptor 202 configured to mechanically couple to the bulb mount 402 of the movie theatre projector, the primary LED Emitter mounting plate 222 and at least one LED (e.g., LED array 228, SMD-type LED, COB-type LED, etc.) directly or indirectly attached to the primary LED Emitter mounting plate 222. The light assembly may also include a cooling assembly configured to dissipate heat from the primary LED Emitter mounting plate 222. The cooling assembly may include a heat sink configured to dissipate heat from the primary LED Emitter mounting plate, a cooling fan configured to generate airflow past the heat sink and/or one or more thermal pads in contact with the primary LED Emitter mounting plate, but not necessarily all of these. The light assembly may also include a lens 236 configured to collimate light emitted from the at least one LED. The lens 236 may be attached directly or indirectly to the primary LED emitter mounting plate 222.

Figure 5:
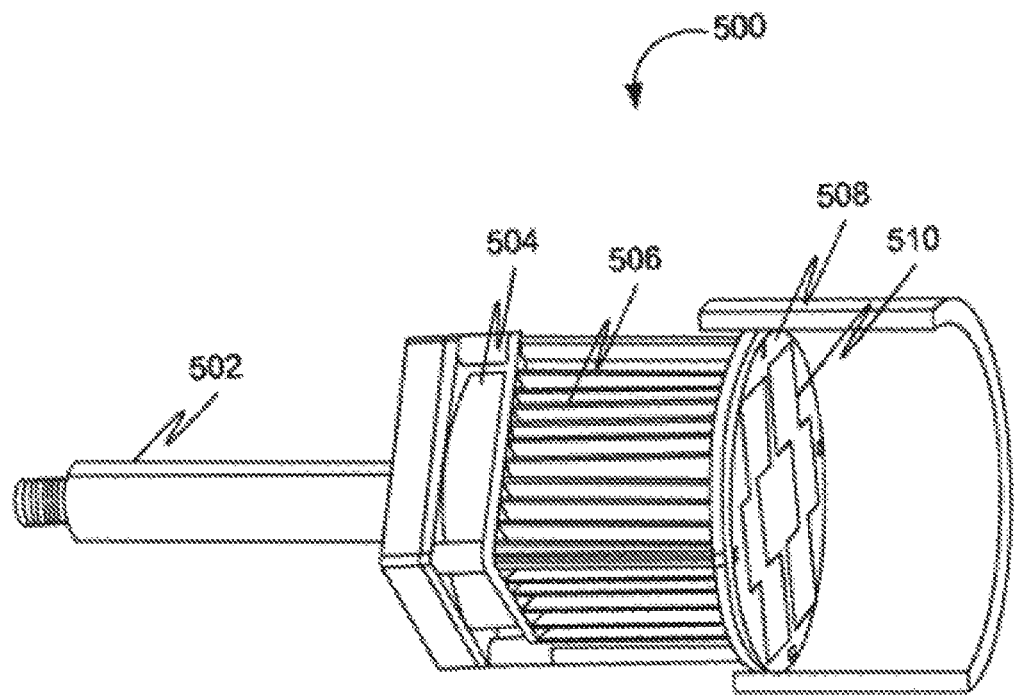
FIG. 5 shows a perspective view of a light assembly configured to be installed in a movie theatre projector, in accordance with some embodiments.
Figure 6:
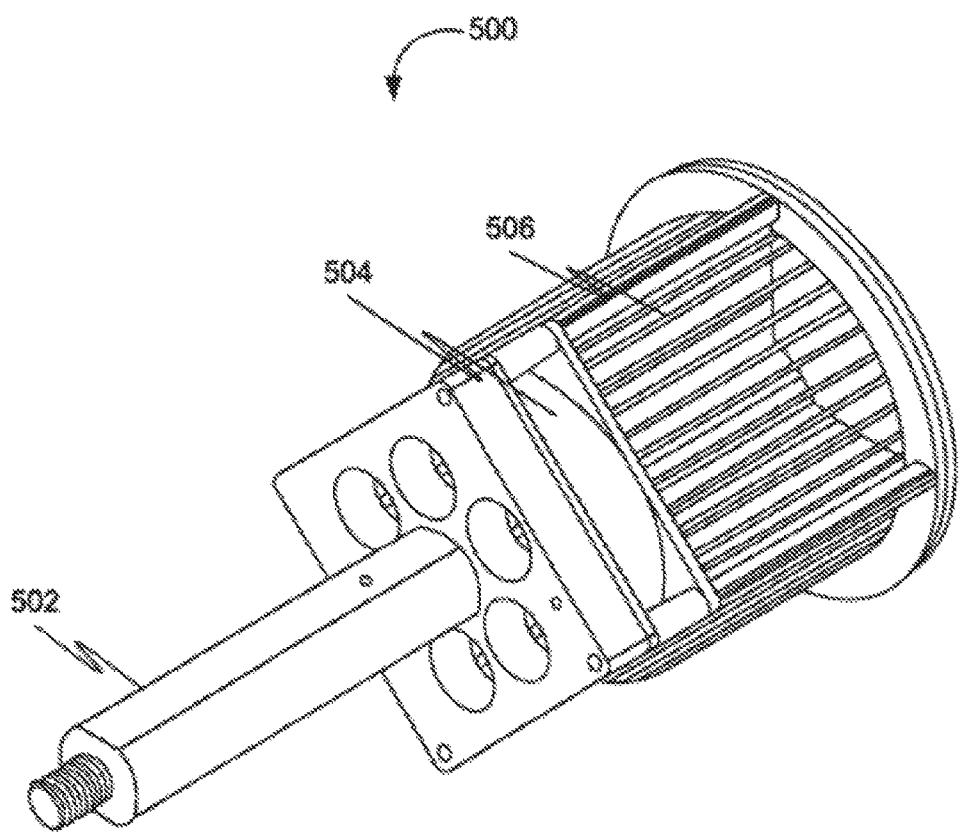
FIG. 6 shows a perspective view of the light assembly of FIG. 5.

FIG. 5 shows a perspective view of a light assembly 500 configured to be installed in movie theatre projector, in accordance with some embodiments. FIG. 6 shows another perspective view of the light assembly 500. The light assembly 500 may include an adaptor 502 configured to mechanically couple with a bulb mount 402 of the movie theatre projector. Further, the light assembly 500 may include one or more cooling fans 504 configured to generate airflow, where the one or more cooling fans 504 may be attachable to the adaptor 502 using a first attaching means. Further, the light assembly 500 may include a heat sink 506 configured to dissipate heat, where the heat sink 506 is attachable to the one or more cooling fans 504 using the first attaching means.

Moreover, the light assembly 500 may include a first thermal transfer pad (not shown) configured to conduct heat, where the first thermal transfer pad is attachable to the heat sink 506 using a second attaching means. The light assembly 500 may also include a primary mounting plate configured to be attached to the first thermal transfer pad using the second attaching means. Further, the light assembly 500 may include a second thermal transfer pad configured to conduct heat, where the second thermal transfer pad is attachable to the primary mounting plate using the second attaching means.

In addition, the light assembly 500 may include a board 508 configured to be attached to the second thermal transfer pad using the second attaching means. The light assembly 500 may also include LED Array 510 configured to generate light, where the LED Array 510 is mounted on the board 508. Further, the light assembly 500 may include a lens mounting plate (not shown) configured to be attached to the primary mounting plate using a third attaching means, where the lens mounting plate is transparent to the light emitted by the LED Array 510. The light assembly 500 may include multiple lens mount standoffs configured to maintain a predetermined distance between the lens mounting plate and the primary mounting plate when the lens mounting plate is attached to the primary mounting plate. Further, a lens may be configured to collimate light emitted from the LED Array, where the lens may be disposed over the lens mounting plate. Yet further, a lens retainer may be configured to be attached to the lens mounting plate using a fourth attaching means, where attaching the lens retainer to the lens mounting plate secures a placement of the lens on the lens mounting plate.

Figure 7:
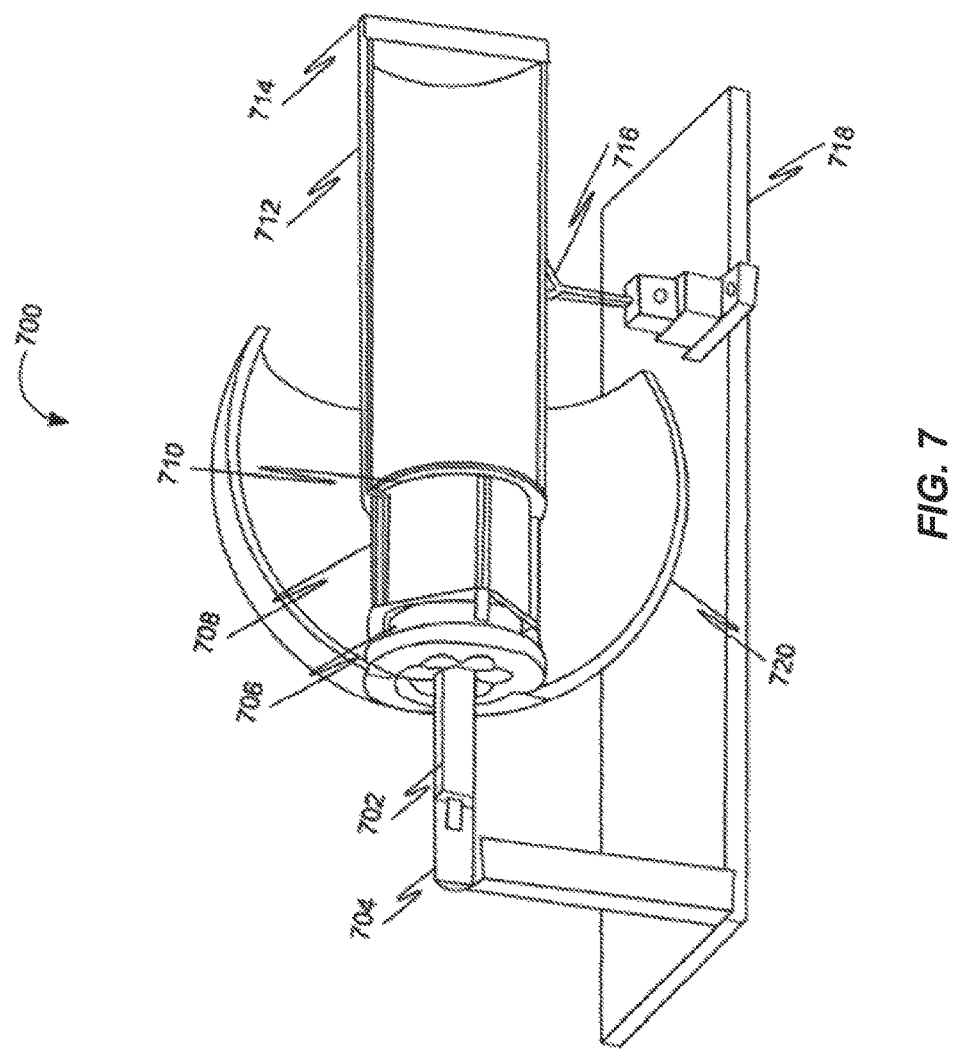
FIG. 7 shows a perspective view of a light assembly retrofitted in a movie theatre projector, in accordance with some embodiments.

FIG. 7 shows a perspective view of a light assembly 700 retrofitted in a movie projector, in accordance with some embodiments. The light assembly 700 may include an adaptor 702 configured to mechanically couple with a bulb mount 704 of the movie projector. Further, the light assembly 700 may include one or more cooling fans 706 configured to generate airflow, where the one or more cooling fans 706 may be attachable to the adaptor 702 using a first attaching means.

Moreover, the light assembly 700 may include a heat sink 708 configured to dissipate heat, where the heat sink 708 may be attachable to the one or more cooling fans 706 using the first attaching means. The light assembly 700 may also include a first thermal transfer pad configured to conduct heat, where the first thermal transfer pad is attachable to the heat sink 708 using a second attaching means. Further, the light assembly 700 may include a primary mounting plate configured to be attached to the first thermal transfer pad using the second attaching means. Yet further, a second thermal transfer pad may be configured to conduct heat, where the second thermal transfer may be attachable to the primary mounting plate using the second attaching means.

In addition, the light assembly 700 may also include a board 710 configured to be attached to the second thermal transfer pad using the second attaching means. Further, the light assembly 700 may include LED Array configured to generate light, where the LED Array is mounted on the board 710. Yet further, a shroud 712 configured to collimate light generated by the LED Array onto a projector lens 714 comprised in the movie theatre projector, where the shroud 712 is configured to be attached to the board 710. In an embodiment, the shroud 712 may be configured to be attached to the lens mounting plate by a fastener, such as, but not limited to, screws. Accordingly, the shroud 712 may be rigidly attached to the lens mounting plate while being freely movable with respect to the movie theatre projector lens.

Further, the light assembly 700 may also include an adjustment rod 716 configured to adjust an alignment of the light assembly 700 in relation to the projector lens, where a foot portion of the adjustment rod 716 is configured to be immovably mounted on a base 718 of the movie theatre projector, where a head portion of the adjustment rod is movably attachable to the shroud 712.

Further, the adaptor 702 may be configured to form a tight contact with an interior surface of a projector shroud 720 comprised in the movie theatre projector, where the tight contact directs air flow for cooling, and where the light assembly 700 may be configured to be disposed within an interior volume of the projector shroud 720.

FIGS. 8A-8B show perspective views of a light assembly retrofitted in a movie theatre projector and including an attachment assembly, in accordance with some embodiments. FIG. 8A shows an adaptor 802 with an elongated portion 804. Primary mount 806 is attached to lens mount 808, in which lens 810 is disposed over the lens mount 808. The primary mount 806 is attached to the lens mount 808 by an attachment assembly that enables the adjustment of the position of the lens mount 808 with respect to the primary mount 806. The attachment assembly or a portion of the attachment assembly may be manipulated (e.g., by rotation or twisting) so as to adjust the distance between the LEDs on the primary mount 806 and a lens aperture involving the lens 810.

For example, the primary mount 806 may be attached to arms 812 that contain the lens mount 808. The lens mount 808 is able to move towards and away from the primary mount 806 while contained within the arms 812. The lens mount 808 may have threaded portions 814 on the outer sides of the lens mount 808 that protrude from the lens mount through the gaps in the arms 812 and are used to guide the lens mount 808 towards and away from the primary mount 806. A collar ring 816 that is threaded on its inner circumference surrounds the arms 812 and the lens mount 808. The threaded portions 814 on the outside of the lens mount 808 engage the threaded portion on the inside of the collar ring 816. The arms 812, the threaded portions 814 and/or the collar ring 816 may be considered an attachment assembly for attaching the primary mount 806 to the lens mount 808 in such a way that the distance between them can be adjusted by manipulation of the attachment assembly or at least a portion of the attachment assembly.

When the collar ring 816 is rotated or twisted in one direction, the lens mount 808 travels away from the primary mount 806, such that the distance between the LED emitters on the primary mount 806 and the lens 810 increases. The before and after positions of this manipulation are shown, respectively, by FIGS. 8A and 8B. When the collar ring 816 is rotated in the other direction, the lens mount 808 draws back towards the primary mount 806. There may be markings 818 that indicated what mark the lens mount 808 is to be moved to based on the type of conventional bulb that is being replaced by the light assembly. The attachment assembly may also be a "twist-lock" system that locks in place at each of the settings.

Figure 9A:
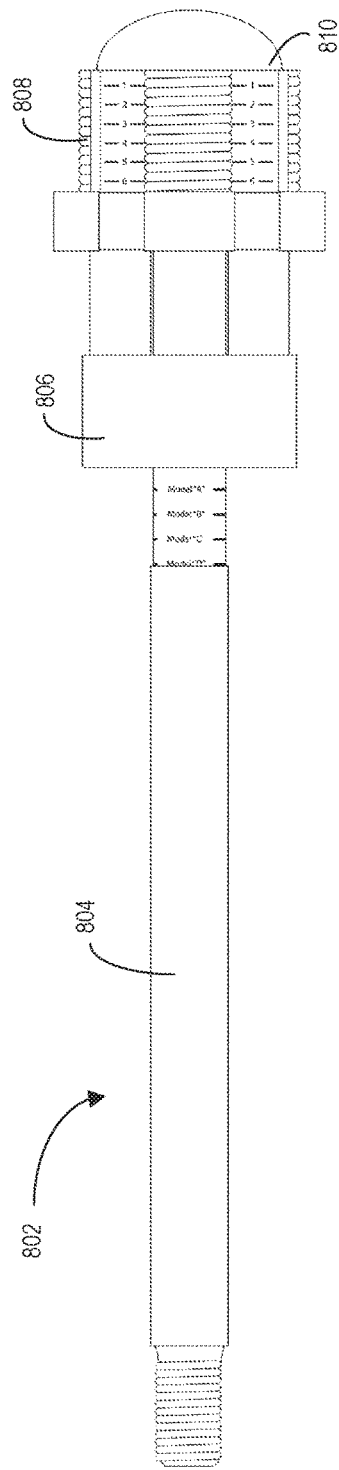
FIGS. 9A-9B show a perspective views of a light assembly retrofitted in a movie theatre projector with an adjustable adaptor, in accordance with some embodiments.
Figure 9B:
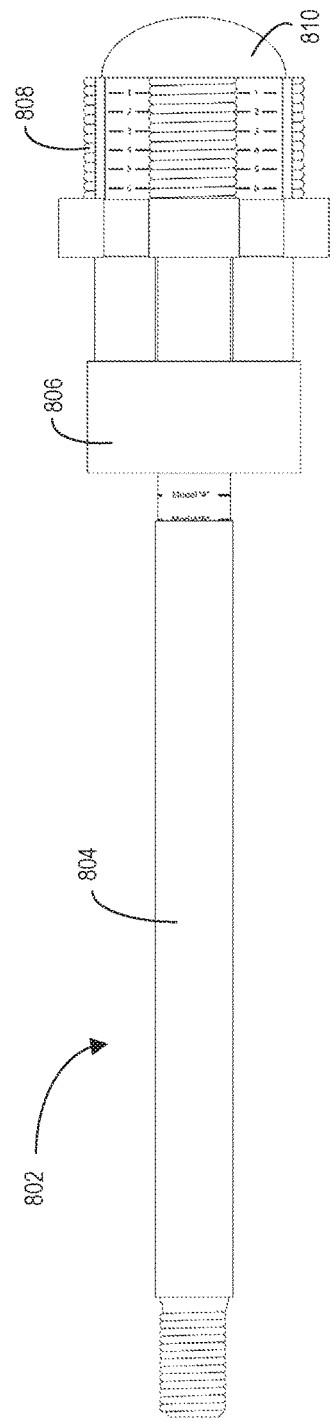

FIGS. 9A-9B show perspective views of a light assembly retrofitted in a movie theatre projector with an adjustable adaptor, in accordance with some embodiments. FIG. 9B shows the elongated portion 804 of the adaptor 802 adjusted to be shorter than the elongated portion 804 shown in FIG. 9A. The adjustment may be made by manipulation (e.g., rotation or twisting) of the adaptor 802, or the elongated portion 804 of the adaptor 802. This adjustment changes the distance between the bulb mount 402 and ultimately the primary mount 806. This may also be a twist-lock system that can be adjusted to markings (e.g., for model "A", model "B", etc.) based on the conventional bulb model being replaced. These adjustable features provide for in-place sizing of the light assembly (e.g., without changing out attachment assembly parts) that accounts for different sizes of the conventional bulb that is being replaced.

Although the invention has been explained in conjunction with a number of embodiments, it is evident that many alternatives, modifications and variations would be or are apparent to those of ordinary skill in the applicable arts. Accordingly, applicant intends to embrace all such alternatives, modifications, equivalents and variations that are within the spirit and scope of this invention.

What is claimed is:

1. A light assembly configured to be installed in a movie theatre projector, the light assembly comprising:
    an adaptor configured to mechanically couple to a bulb mount of the movie theatre projector;
    a primary Light Emitting Diode (LED) Emitter mounting plate;
    at least one LED directly or indirectly attached to the primary LED Emitter mounting plate;
    a heat sink configured to dissipate heat from the primary LED Emitter mounting plate;
    a cooling fan configured to generate airflow across the heat sink;
    a lens mounting plate;
    a lens configured to collimate light emitted from the at least one LED, wherein the lens is disposed over the lens mounting plate; and
    an attachment assembly configured to attach the lens mounting plate to the primary LED Emitter mounting plate.

2. The light assembly of claim 1, wherein the attachment assembly comprises a plurality of lens mount standoffs that attach the lens mounting plate to the primary LED Emitter mounting plate so as to maintain a predetermined distance between the at least one LED and the lens.

3. The light assembly of claim 1, wherein the attachment assembly is configured to be manipulated to adjust a distance between the at least one LED and the lens.

4. The light assembly of claim 3, wherein the attachment assembly is configured to adjust the distance between the at least one LED and the lens in response to a rotation of the attachment assembly or a portion of the attachment assembly.

5. The light assembly of claim 1, wherein the lens mounting plate is transparent to the light emitted by the at least one LED.

6. The light assembly of claim 1, further comprising a lens retainer directly or indirectly attached to the lens mounting plate, wherein attachment of the lens retainer to the lens mounting plate secures a placement of the lens on the lens mounting plate.

7. The light assembly of claim 1, wherein the at least one LED is one of a surface-mount device (SMD) LED type and a large chip-on-board (COB) type.

8. The light assembly of claim 1, wherein the adaptor is configured to be manipulated to adjust a distance between the bulb mount of the movie theatre projector and the primary LED Emitter mounting plate.

9. A light assembly configured to be installed in a movie theatre projector, the light assembly comprising:
    an adaptor configured to mechanically couple to a bulb mount of the movie theatre projector at a first end of the adaptor,
    a primary Light Emitting Diode (LED) Emitter mounting plate;
    at least one LED directly or indirectly attached to the primary LED Emitter mounting plate;
    a heat sink configured to dissipate heat from the primary LED Emitter mounting plate; and a cooling fan configured to generate airflow past the heat sink, wherein the adaptor comprises an elongated portion extending from the first end of the adaptor towards the primary LED Emitter mounting plate, wherein the adaptor is configured to be manipulated to adjust a length of the elongated portion so as to adjust a location of the primary LED Emitter mounting plate in relation to a projector lens aperture.

10. The light assembly of claim 9, wherein the adaptor is configured to adjust the length of the elongated portion in response to a rotation of the adaptor or the elongated portion.

11. The light assembly of claim 9, wherein the adaptor is further configured to form a tight contact with an interior surface of a projector shroud in the movie theatre projector, wherein the tight contact directs air flow across the heat sink for cooling, and wherein the light assembly is configured to be disposed within an interior volume of the projector shroud.

12. A light assembly configured to be installed in a movie theatre projector, the light assembly comprising:
   an adaptor configured to mechanically couple to a bulb mount of the movie theatre projector;
   a primary Light Emitting Diode (LED) Emitter mounting plate;
   at least one LED directly or indirectly attached to the primary LED Emitter mounting plate;
   a cooling assembly configured to dissipate heat from the primary LED Emitter mounting plate; and
   a lens configured to collimate light emitted from the at least one LED.

13. The light assembly of claim 12, wherein the cooling assembly comprises at least one of:
   a heat sink configured to dissipate heat from the primary LED Emitter mounting plate;
   a cooling fan configured to generate airflow past the heat sink; and
   one or more thermal pads in contact with the primary LED Emitter mounting plate.

14. The light assembly of claim 12, wherein the bulb mount corresponds to one of an anode and a cathode.

15. The light assembly of claim 12, wherein the adaptor is configured to mechanically couple to a bulb mount that is configured for receiving at least one of an arc discharge lamp and an incandescent lamp.

* * * * *